United States Patent
Marson et al.

(10) Patent No.: US 11,750,137 B2
(45) Date of Patent: Sep. 5, 2023

(54) LAUNDRY TREATING MACHINE AND METHOD FOR OPERATING A LAUNDRY TREATING MACHINE

(71) Applicant: Electrolux Appliances Aktiebolag, Stockholm (SE)

(72) Inventors: Enrico Marson, Porcia (IT); Gilberto Pin, Porcia (IT); Paolo Posa, Porcia (IT); Luca Della Schiava, Porcia (IT)

(73) Assignee: Electrolux Appliances Aktiebolag

( * ) Notice: Subject to any disclaimer, the term of this patent is extended or adjusted under 35 U.S.C. 154(b) by 325 days.

(21) Appl. No.: 17/262,027

(22) PCT Filed: Jul. 25, 2019

(86) PCT No.: PCT/EP2019/070031
§ 371 (c)(1),
(2) Date: Jan. 21, 2021

(87) PCT Pub. No.: WO2020/021005
PCT Pub. Date: Jan. 30, 2020

(65) Prior Publication Data
US 2021/0297030 A1    Sep. 23, 2021

(30) Foreign Application Priority Data
Jul. 26, 2018  (EP) ..................................... 18185870

(51) Int. Cl.
*H02P 27/08* (2006.01)
*H02P 21/22* (2016.01)
(Continued)

(52) U.S. Cl.
CPC .............. *H02P 27/08* (2013.01); *D06F 23/02* (2013.01); *D06F 34/10* (2020.02); *D06F 37/304* (2013.01);
(Continued)

(58) Field of Classification Search
CPC ....................................................... H02P 27/08
See application file for complete search history.

(56) References Cited

U.S. PATENT DOCUMENTS

| 8,531,148 B2 | 9/2013 | Sumita et al. |
| 10,187,000 B2 | 1/2019 | Borisov et al. |

(Continued)

FOREIGN PATENT DOCUMENTS

| CN | 102315815 A | 1/2012 |
| CN | 103795081 A1 | 5/2014 |

(Continued)

OTHER PUBLICATIONS

International Search Report and Written Opinion for International Application No. PCT/EP2019/070031, dated Nov. 26, 2019, 14 pages.

(Continued)

*Primary Examiner* — Jason Y Ko
(74) *Attorney, Agent, or Firm* — RatnerPrestia

(57) ABSTRACT

A laundry machine having a casing, a drum a motor to rotate the drum, and an inverter-based apparatus to control the motor. The inverter-based apparatus comprises: an input stage configured to convert alternating mains voltage to rectified DC voltage, an electrolytic capacitor-less inverter configured to generate output currents to feed to the electric moto based on duty cycles of switching signals, a DC-link connecting the electrolytic capacitor-less inverter to the input stage and crossed by DC-link currents from/towards the electrolytic capacitor-less inverter, a DC-link capacitor connected to the DC-link, a regulator system configured to control duty cycles of switching signals based on determined/estimated motor values indicating a controlled parameter of said motor, and a motor reference value associated to the controlled parameter of the motor, and an active voltage limiter unit configured to regulate the motor refer- (Continued)

ence value to limit the DC-link capacitor voltage within a predetermined voltage range.

21 Claims, 5 Drawing Sheets

(51) Int. Cl.
*D06F 34/10* (2020.01)
*D06F 23/02* (2006.01)
*D06F 37/30* (2020.01)
*H02P 21/14* (2016.01)
*D06F 105/46* (2020.01)
*D06F 103/46* (2020.01)
*D06F 103/24* (2020.01)

(52) U.S. Cl.
CPC .............. *H02P 21/14* (2013.01); *H02P 21/22* (2016.02); *D06F 2103/24* (2020.02); *D06F 2103/46* (2020.02); *D06F 2105/46* (2020.02)

(56) References Cited

U.S. PATENT DOCUMENTS

| 10,431,984 | B2 | 10/2019 | Mouni et al. |
| 2010/0052611 | A1 | 3/2010 | Lyle, Jr. |
| 2014/0265987 | A1 | 9/2014 | Chretien et al. |
| 2014/0306638 | A1 | 10/2014 | Wu et al. |

FOREIGN PATENT DOCUMENTS

| CN | 107070286 A | 8/2017 |
| CN | 107567680 A | 1/2018 |
| CN | 107925245 A | 4/2018 |
| DE | 102016108471 A1 | 11/2016 |
| EP | 2586898 A1 | 5/2013 |
| EP | 3057226 A1 | 8/2016 |
| JP | 2004104959 A | 4/2004 |
| WO | 2014130201 A1 | 8/2014 |

OTHER PUBLICATIONS

Dianov et al., "Future Drives of Home Appliances: Elimination of the Electrolytic DC-Link Capacitor in Electrical Drives for Home Appliances", IEEE Industrial Electronics Magazine, IEEE, US, Sep. 1, 2015, vol. 9(3), pp. 10-18, XP011669544 [retrieved on Sep. 17, 2015].
European Communication pursuant to Article 94(3) for European Application No. 19737798.9, dated Apr. 19, 2022, 7 pages.
European Communication pursuant to Article 94(3) for European Application No. 19737798.9, dated Apr. 5, 2023, 8 pages.
Chinese Office Action for Chinese Application No. 201980049163. X, dated Apr. 28, 2023 with translation, 24 pages.
Bojoi, "Sensorless Direct Flux and Torque Control for Direct Drive Washing Machine Applications", IEEE, 2011, pp. 348-353.

LAUNDRY TREATING MACHINE AND METHOD FOR OPERATING A LAUNDRY TREATING MACHINE

This application is a U.S. National Phase application of PCT International Application No. PCT/EP2019/070031, filed Jul. 25, 2019, which claims the benefit of EP 18185870.5, filed Jul. 26, 2018, both of which are incorporated by reference herein.

The present invention concerns the field of laundry treating machine, such as laundry washing machine to which the following description refers purely by way of example. More specifically, the present invention relates to laundry treating machines provided with a permanent magnet motor or an induction motor for rotating the laundry drum and an inverter-based-apparatus configured to operate said electric motor.

BACKGROUND ART

As is known, nowadays inverters driving motors are widely applied to home appliances. In general, an inverter driving motor comprises an input stage and an inverter bridge, which is provided, in turn, with a plurality of switching units, which are controlled in order to generate and modulate an AC voltage to be fed to motor terminals. The input stage generally comprises a diode bridge having inputs coupled to mains for receiving the AC mains voltage, outputs for providing a DC voltage, and an electrolytic capacitor for removing voltage ripples which appear in rectified voltage.

Depending on the power size, the inverters for home appliances are usually configured in order to have a high capacitance so as to keep the ripple voltage, and thus a ripple current, within a reasonable level, generally comprised between 10% to 15%. Indeed the electrolytic capacitor worsen the life expectation if the ripple voltage/current increases, and a small ripple voltage is recommended for a seamless drive of the motor. However if, on the one side, a flat and stable DC voltage across capacitor, i.e. low ripple voltage, improves the performance of motor driving algorithms, on the other side, it affects the mains current by harmonics.

In order to solve such problem, inverters for laundry treating machines are usually provided with a power factor corrector unit (active or passive) which comprises an inductor having enough inductance to increase the power factor (thus the harmonics) to the desired value.

However, power factor corrector unit has the disadvantage to be an expensive and bulky component.

SUMMARY

Aim of the present invention is to solve the drawbacks referred above.

The above aim is achieved by the present invention, which relates to a laundry treating machine comprising: a casing, a laundry drum mounted inside said casing to rotate about a rotation axis, an electric motor designed to rotate said laundry drum about said rotation axis, an inverter-based apparatus which is configured to control said electric motor and comprises: an input stage which is connected to mains lines for receiving AC lines currents and AC mains voltage and configured to convert said alternating mains voltage AC to a rectified DC voltage, an electrolytic capacitor-less inverter configured to generate output currents to be fed to said electric motor based on duty cycles of switching signals, a DC-link which connects said electrolytic capacitor-less inverter to said input stage and is crossed by DC-link currents from, or towards, said electrolytic capacitor-less inverter, a DC-link capacitor connected to said DC-link, a regulator system which is configured to control the duty cycles of switching signals based on at least a determined/estimated motor value indicative of a controlled parameter of said electric motor, and at least a motor reference value, which is associated to said controlled parameter of said electric motor, the inverter-based apparatus further comprises an active voltage limiter unit, which is configured to regulate said motor reference value in order to limit the DC-link capacitor voltage within a predetermined voltage range.

Preferably, said determined/estimated motor values correspond to said output currents, said motor reference values correspond to said current references, said laundry treating machine comprises: voltage sensor means configured to determine the amplitude of said DC-link capacitor voltage, current sensor means configured to determine the amplitude of output currents provided to said electric motor by said electrolytic capacitor-less inverter, said regulator system being configured to control said duty cycles of the switching units of said electrolytic capacitor-less inverter based on said output currents and said current references, said active voltage limiter unit is configured to regulate said current references of said regulator system in order to cause said DC-link capacitor voltage to be limited within said predetermined voltage range.

Preferably, said active voltage limiter unit is further configured to regulate said current references of said regulator system in order to cause said DC-link capacitor voltage to be limited within said predetermined voltage range, without using said lines currents and/or DC-link currents.

Preferably, said active voltage limiter unit is further configured to clamp said DC-link capacitor voltage to a prefixed value, when said electric motor regenerates back current to said the DC-link capacitor via said electrolytic capacitor-less inverter.

Preferably, said active voltage limiter unit is further configured to: determine an active current based on said output currents and said duty cycles; regulate said current references based on said active current and said DC-link capacitor voltage.

Preferably, said active voltage limiter unit is further configured to determine a first active current based on the d-q axis-wise duty cycles which are indicative of said duty cycles of the switching signals and d-q axis-wise currents indicative of said output currents Preferably, said active voltage limiter unit is configured to determine a second active current based on the d-q axis-wise duty cycles indicative of said duty cycles of the switching signals and said determined current references.

Preferably, said active voltage limiter unit is further configured to determine said active current by computing a minimum current between said first and second active currents.

Preferably, said active voltage limiter unit is further configured to determine two maximum absolute correction signals on the basis of said second active current and said d-q axis-wise duty cycles.

Preferably, said active voltage limiter unit is further configured to determine an instantaneous maximum allowable regeneration current based on a measured voltage level and a parameter indicative of a maximum absolute active current for regeneration.

Preferably, said active voltage limiter unit is further configured to determine an instantaneous maximum allowable regeneration current based on the following equation $$i_{a_{IstAbs}}(t) = \omega_V(t) i_{a_{MaxAbs}}$$

wherein where $\omega_V(t)$ is a weight coefficient that depends on: said DC-link capacitor voltage Vdc(t), a nominal DC-link voltage (Vdcnom), and a predetermined high-voltage limit (Vhigh).

Preferably, said active voltage limiter unit is further configured to determine a negative fraction of correction to be applied according to an empirical saturated-cubic equation:

$$\rho(t) = \text{sat}\left[\left(\frac{i_{a_{ws}}(t) + i_{a_{IstAba}}(t)}{i_{a_{IstAba}}(t)}\right)\right]_{-1}^{0}$$

Preferably, said active voltage limiter unit is further configured to determine unconstrained axis-wise corrections as a fraction of the maximum correction by the following equation:

$$i_{d_{unc}}(t) = \rho(t) i_{d_{max}}(t)$$

$$i_{q_{unc}}(t) = \rho(t) i_{q_{max}}(t)$$

Preferably, said active voltage limiter unit is further configured to determine constrained axis-wise current corrections by applying the following saturation and correction equations $$i_{q_{corr}}(t) = \begin{cases} \max(i_{q_{unc}}(t), 0) & \text{if } \omega(t) > 0 \\ \min(i_{q_{unc}}(t), 0) & \text{if } \omega(t) < 0 \end{cases}$$

$$i_{d_{corr}}(t) = \min(i_{d_{unc}}(t), 0) - K_{qd} \text{abs}(i_{q_{corr}}(t) - i_{q_{unc}}(t))$$

wherein:
Kqd is a positive tuning gain that may be used to transfer to the d-axis part of the correction originally computed for the q-axis, when saturation occurs,
idunc and iqunc are said axis-wise current corrections.

Preferably, said active voltage limiter unit is configured to modify said current references according to the following equations:

$$i_{d_{refMod}}(t) = i_{d_{ref}}(t) + i_{d_{corr}}(t)$$

$$i_{q_{refMod}}(t) = i_{q_{ref}}(t) + i_{q_{corr}}(t)$$

Preferably, said determined/estimated motor values correspond to an estimated torque of said electric motor and said motor reference values correspond to a torque reference, said regulator system is configured to receive said estimated torque and said torque reference and control the switching units of said electrolytic capacitor-less inverter based on said estimated torque and said torque reference, said active voltage limiter unit is configured to regulate said torque reference of said regulator system in order to cause said DC-link capacitor voltage to be limited within said predetermined voltage range.

Preferably, said active voltage limiter unit is configured to regulate said torque reference of said regulator system in order to cause said DC-link capacitor voltage to be limited within said predetermined voltage range, without using said lines currents and/or DC-link currents.

Preferably, said active voltage limiter unit is configured to: receive first voltage signals indicative of the duty cycles of said switching signals; receive first current signals indicative of said output currents provided to said electric motor, receive said voltage of the DC-link capacitor, determine a torque limit value based on said first voltage signals, said first current signals, and said voltage of the DC-link capacitor.

Preferably, said active voltage limiter unit is configured to: determine an active current based on said first voltage signals and said first current signals, determine an instantaneous maximum allowable regeneration current based on the measured voltage level and the prefixed parameter corresponding to a maximum absolute active current or regeneration by means of the following equation: iaIstAbs(t)=ωV*IaMaxAbs, wherein ωV is a weight coefficient that depends on the voltage Vdc(t) and a nominal DC-link voltage Vdcnom and on a highvoltage limit Vhigh;

calculate a current value indicative of the difference between said active current and said maximum allowable regeneration current, performing a proportional-integral function on said current value to calculate said torque limit.

Preferably said inverter-based apparatus further comprises comparator means which are configured to: receive in input the motor speed, receive in input said torque limit, receive a torque target which is indicative of a torque requested to said electric motor, compare said torque target with the said torque limit, set the torque reference with the torque limit when said motor speed is positive and said torque target is lower or equal to said torque limit.

Preferably said comparator means are further configured to set the torque reference with the torque limit, when the motor speed ω is negative and the torque target is greater than, or equal to the torque limit.

The present invention further relates to a method to control a laundry treating machine comprising: a casing, a laundry drum mounted inside said casing to rotate about a rotation axis, an electric motor designed to rotate said laundry drum about said rotation axis, an inverter-based apparatus, which is configured to control said electric motor and comprises: an input stage which is connected to mains lines for receiving AC lines currents and AC mains voltage and configured to convert said alternating mains voltage AC to a rectified DC voltage, an electrolytic capacitor-less inverter configured to generate output currents to be fed to said electric motor based on duty cycles of switching signals, a DC-link which connects said electrolytic capacitor-less inverter to said input stage and is crossed by DC-link currents from, or towards, said electrolytic capacitor-less inverter, a DC-link capacitor connected to said DC-link, a regulator system, which is configured to control the duty cycles of switching signals based on at least a determined/estimated motor value indicative of a controlled parameter of said electric motor, and at least a motor reference value, which is associated to said controlled parameter of said electric motor, the method further comprises the step of regulating said motor reference value in order to limit the DC-link capacitor voltage within a predetermined voltage range.

Preferably, said determined/estimated motor values correspond to said output currents, said motor reference values correspond to said current references, said method comprises: determining the amplitude of said DC-link capacitor voltage, determining the amplitude of output currents provided to said electric motor by said electrolytic capacitor-less inverter, said regulator system being configured to control said duty cycles of the switching units of said electrolytic capacitor-less inverter based on said output currents and said current references, said method regulates said current references of said regulator system in order to cause said DC-link capacitor voltage to be limited within said predetermined voltage range.

Preferably, the method comprises the step of regulating said current references of said regulator system in order to cause said DC-link capacitor voltage to be limited within said predetermined voltage range, without using said lines currents and/or DC-link currents.

Preferably, the method comprises the step of clamping said DC-link capacitor voltage to a prefixed value, when said electric motor regenerates back current to said the DC-link capacitor via said electrolytic capacitor-less inverter.

Preferably, the method comprises: determining an active current based on said output currents and said duty cycles, regulating said current references based on said active current and said DC-link capacitor voltage.

Preferably, the method comprising the step of determining a first active current based on the d-q axis-wise duty cycles which are indicative of said duty cycles of the switching signals and d-q axis-wise currents indicative of said output currents.

Preferably, the method comprising the step of determining a second active current based on the d-q axis-wise duty cycles indicative of said duty cycles of the switching signals and said determined current references.

Preferably, the method comprising the step of determining said active current by computing a minimum current between said first and second active currents.

Preferably, the method comprising the step of determining two maximum absolute correction signals on the basis of said second active current and said d-q axis-wise duty cycles.

Preferably, the method comprising the step of determining an instantaneous maximum allowable regeneration current based on a measured voltage level and a parameter indicative of a maximum absolute active current for regeneration.

Preferably, the method comprising the step of determining an instantaneous maximum allowable regeneration current based on the following equation $$i_{a_{IstAbs}}(t) = \omega_V(t) i_{a_{MaxAbs}}$$

wherein where $\omega^V(t)$ is a weight coefficient that depends on: said DC-link capacitor voltage Vdc(t), a nominal DC-link voltage (Vdcnom), and a predetermined high-voltage limit (Vhigh).

Preferably, the method comprising the step of determining a negative fraction of correction to be applied according to an empirical saturated-cubic equation:

$$\rho(t) = \text{sat}\left[\left(\frac{i_{a_{ws}}(t) + i_{a_{IstAba}}(t)}{i_{a_{IstAba}}(t)}\right)\right]_{-1}^{0}$$

Preferably, the method comprising the step of determining unconstrained axis-wise corrections as a fraction of the maximum correction by the following equation:

$$i_{d_{unc}}(t) = \rho(t) i_{d_{max}}(t)$$

$$i_{q_{unc}}(t) = \rho(t) i_{q_{max}}(t)$$

Preferably, the method comprising the step of determining constrained axis-wise current corrections by applying the following saturation and correction equations $$i_{q_{corr}}(t) = \begin{cases} \max(i_{q_{unc}}(t), 0) & \text{if } \omega(t) > 0 \\ \min(i_{q_{unc}}(t), 0) & \text{if } \omega(t) < 0 \end{cases}$$

$$i_{d_{corr}}(t) = \min(i_{d_{unc}}(t), 0) - K_{qd} \, \text{abs}(i_{q_{corr}}(t) - i_{q_{unc}}(t))$$

wherein:
Kqd is a positive tuning gain that may be used to transfer to the d-axis part of the correction originally computed for the q-axis, when saturation occurs,
idunc and iqunc are said axis-wise current corrections.

Preferably, the method comprises the step of modifying said current references according to the following equations:

$$i_{d_{refMod}}(t) = i_{d_{ref}}(t) + i_{d_{corr}}(t)$$

$$i_{q_{refMod}}(t) = i_{q_{ref}}(t) + i_{q_{corr}}(t)$$

Preferably, the method comprising the steps of said determined/estimated motor values correspond to an estimated torque of said electric motor, said motor reference values correspond to a torque reference, said regulator system is configured to receive said estimated torque and said torque reference and control the switching units of said electrolytic capacitor-less inverter based on said estimated torque and said torque reference, said method comprising the step of regulating said torque reference of said regulator system in order to cause said DC-link capacitor voltage to be limited within said predetermined voltage range.

Preferably, the method comprises the step of regulating said torque reference of said regulator system in order to cause said DC-link capacitor voltage to be limited within said predetermined voltage range, without using said lines currents and/or DC-link currents.

Preferably, the method comprises the steps of: receiving first voltage signals indicative of the duty cycles of said switching signals; receiving first current signals indicative of said output currents provided to said electric motor receiving said voltage of the DC-link capacitor, determining a torque limit value based on said first voltage signals, said first current signals, and said voltage of the DC-link capacitor.

Preferably, the method comprises: determining an active current based on said first voltage signals and said first current signals, determining an instantaneous maximum allowable regeneration current based on the measured voltage level and the prefixed parameter corresponding to a maximum absolute active current (ia(t)) for regeneration by means of the following equation: iaIstAbs(t)= ωV*IaMaxAbs, wherein ωV is a weight coefficient that depends on the voltage Vdc(t) and a nominal DC-link voltage Vdcnom and on a highvoltage limit Vhigh; calculate a current value indicative of the difference between said active current and said maximum allowable regeneration current, performing a proportional-integral function on said current value to calculate said torque limit.

Preferably, the method comprises: comparing said torque target with said torque limit, set the torque reference with the torque limit, when said motor speed is positive and said torque target is lower or equal to said torque limit.

Preferably the method comprises the step of: set the torque reference with the torque limit when the motor speed is negative and the torque target is greater than, or equal to the torque limit.

BRIEF DESCRIPTION OF THE DRAWINGS

A non-limiting embodiment of the present invention will now be described, by way of example, with reference to the accompanying drawings, in which.

DESCRIPTION OF EXEMPLARY EMBODIMENTS

Configurations shown in embodiments enumerated in the present specification and the drawings are just exemplary embodiments of the present disclosure, and it should be understood that there are various modified examples capable of replacing the embodiments of the present specification and the drawings at the time of filling the present application.

The present invention has proved to be particularly advantageous when applied to a laundry-treating machine, such as laundry washing machines, as described below.

It should be understood that although the invention is described with reference to a laundry washing machine, other applications are contemplated. As can be appreciated, the present invention can be conveniently applied to other laundry-treating machines, like for example laundry washing and drying machines (called also washer/dryers).

Figure 1:
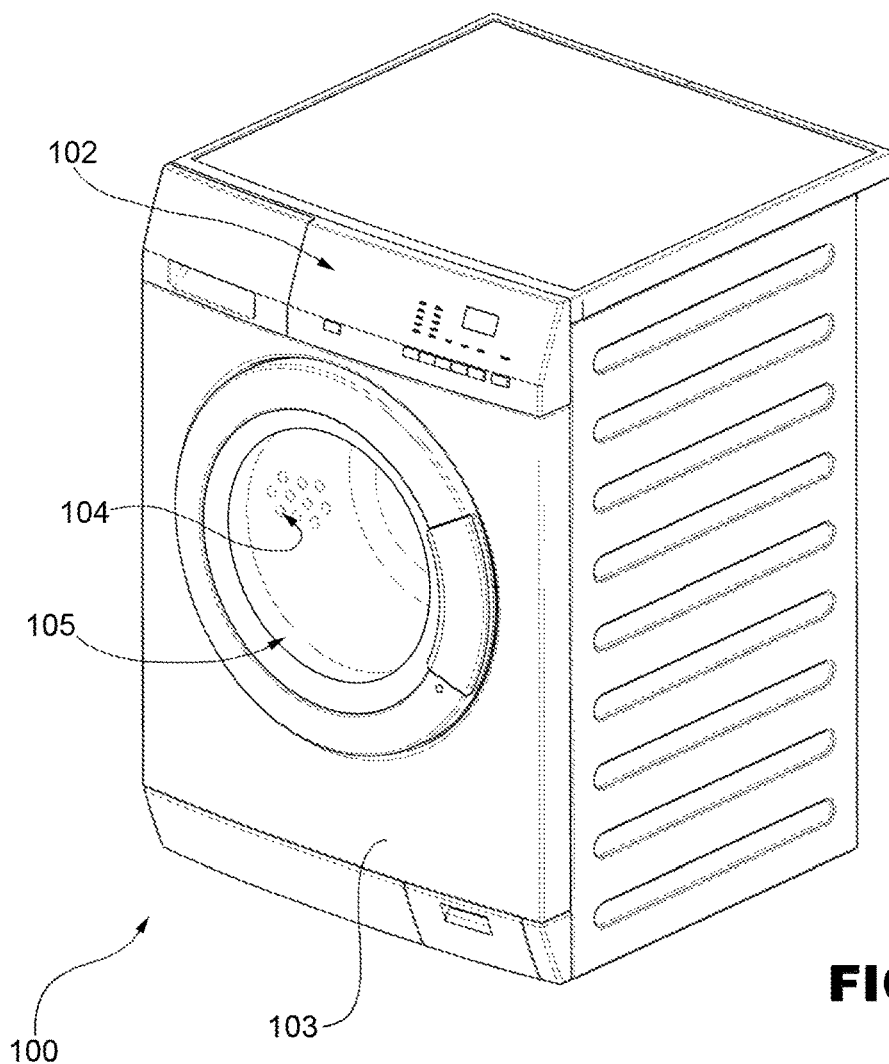
FIG. 1 shows a perspective view of a laundry-treating machine according to a first embodiment of the present disclosure.
Figure 2:
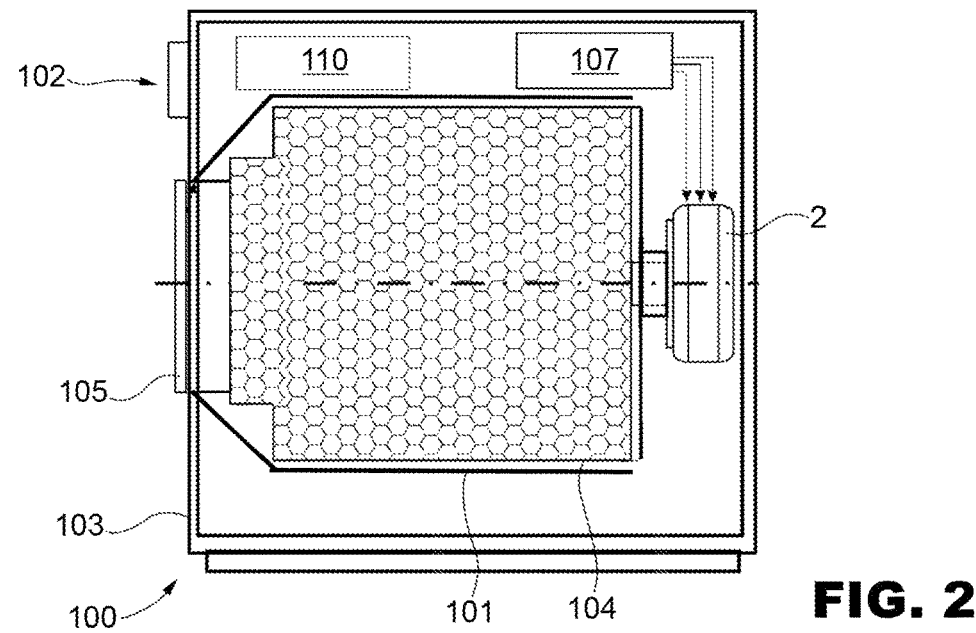
FIG. 2 shows a schematic view of a laundry treating machine provided with an inverter-based apparatus according to the present disclosure.

With reference to FIGS. 1 and 2, reference number 100 indicates as a whole a home laundry-treating machine, which is configured to perform a laundry treating washing program selectable by a user via a control panel 102 among a number of prefixed laundry treating washing programs.

The home laundry-treating machine 1 comprises: a preferably, though not necessarily, substantially parallelepiped-shaped, rigid outer boxlike casing 103, which is structured for resting on the floor; a preferably substantially cylindrical, bell-shaped hollow washing tub 101 (FIG. 2), which is arranged inside the boxlike casing 103 with its opening or mouth directly facing a laundry loading/unloading pass-through opening realized in the front wall of boxlike casing 103.

The home laundry-treating machine 1 further comprises: a preferably substantially cylindrical, elastically-deformable bellows (not shown) watertight connecting the front opening or mouth of the washing tub 101 to the laundry loading/unloading opening realized in the front wall of boxlike casing 103; and a substantially cylindrical, bell-shaped perforated revolving drum 104 structured for housing the laundry to be washed. The revolving drum 104 is housed in axially rotating manner inside the washing tub so as to be able to freely rotate about its longitudinal reference axis preferably, though not necessarily, an horizontal rotation axis. In an alternative embodiment not shown, rotation axis may be vertical or inclined.

According to a preferred embodiment, the revolving drum 104 is housed in axially rotating manner inside the washing tub 101 with its front opening directly faced/aligned to the laundry loading/unloading opening on the front wall of casing 103, and the drum rotation axis is preferably arranged locally substantially coincident with the substantially horizontally-oriented longitudinal reference axis of washing tub 101.

Furthermore, the hollow washing tub 101 may be preferably suspended in floating manner inside the casing 103 via a suspension system preferably, though not necessarily, comprising a couple of upper coil springs (not shown) connecting the upper portion of the washing tub to the top of the boxlike casing 103, and a couple of lower vibration dampers (not shown) connecting the bottom portion of the washing tub to the bottom of the boxlike casing 103.

With reference to FIGS. 1 and 2, the laundry-treating machine 100 furthermore comprises a porthole door 105, which is hinged to the front wall of casing 103 to rotate about a preferably, though not necessarily, vertically-oriented reference axis to and from a closing position in which the peripheral border of the porthole door 105 rests completely on front wall for closing the laundry loading/unloading opening and watertight sealing the washing tub 101.

The laundry-treating machine 100 furthermore comprises an electrically-powered motor assembly, which comprises, in turn, an electric motor 2 (schematically illustrated in FIG. 2) structured for driving into rotation the revolving drum 104 about its longitudinal reference axis inside the washing tub 101. It is understood that electric motor 2 may be directly associated with the shaft of the revolving drum 104 or may be mechanically coupled to revolving drum by means of a belt/pulley system or similar mechanical means (not shown).

Preferably, the electric motor 2 is a three-phase motor, but is not limited thereto. In other words, it should be understood that the present invention is not limited to a three-phase motor 2 but it could be any kind of multi-phases motor, such as bi-phase or poly-phases motor, or similar motor. Preferably, the electric motor 2 may be a permanent magnet motor or an induction motor or any other similar motor.

Figure 3:
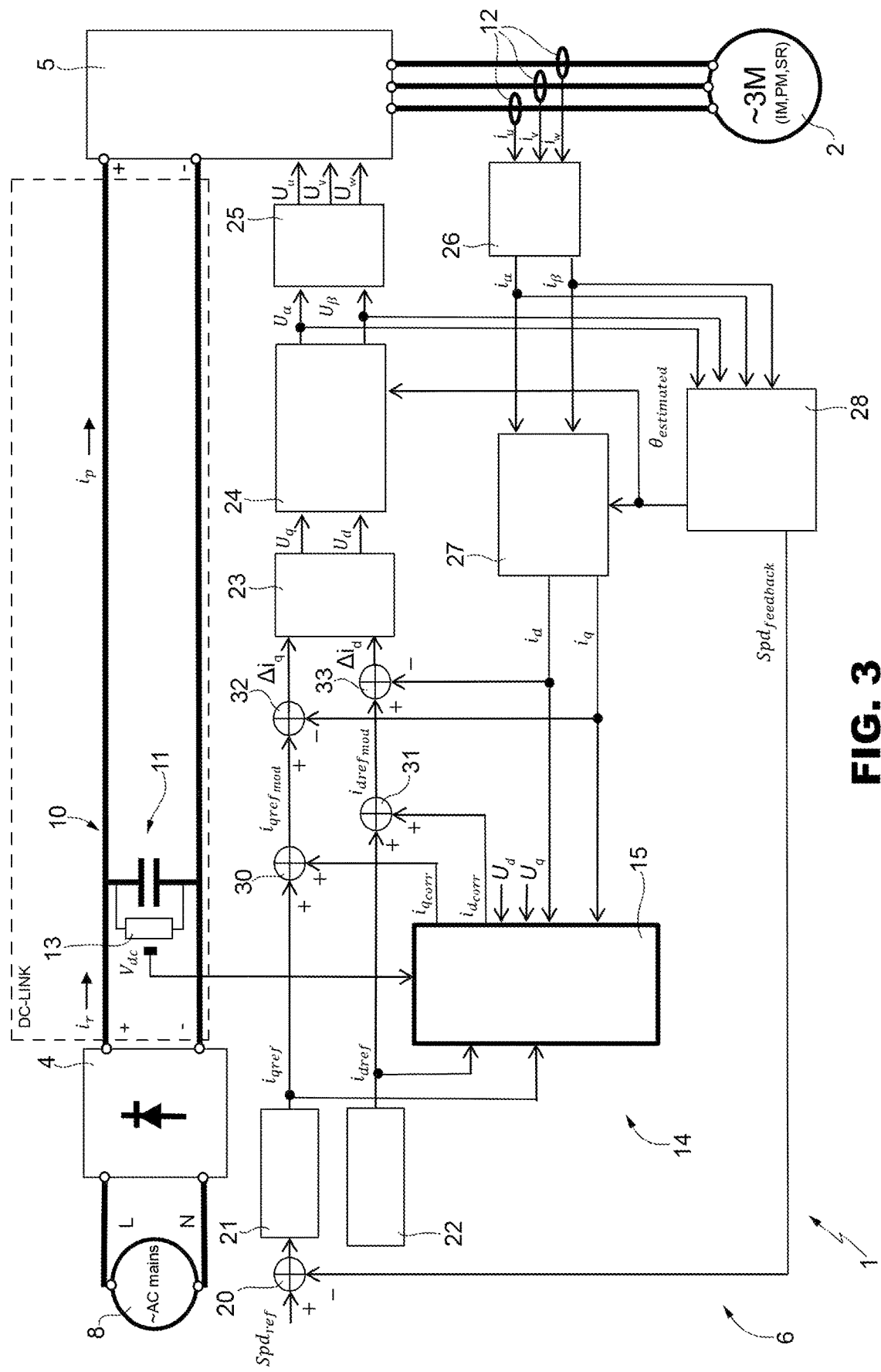
FIG. 3 is a block diagram of an inverter-based apparatus provided according to a first embodiment of the present disclosure.

With reference to FIGS. 2 and 3, the laundry-treating machine 1 furthermore comprises an inverter-based apparatus 1, which is configured to control the electric motor 2 according to control methods disclosed hereinafter.

According to a first embodiment of the present invention, the inverter-based apparatus 1 is schematically illustrated in FIG. 3, and comprises an input stage 4, an inverter 5 and a motor controller stage 6.

According to the first embodiment illustrated in FIG. 3, the input stage 4 comprises a rectifier unit configured to convert an alternating voltage AC, received in input from a power supply system 8, to a rectified DC voltage to be provided in input to the inverter 5. The input stage 4 may comprise, for example, a full-bridge diode rectifier having inputs coupled to AC mains lines of the power supply system 8 for receiving AC mains lines currents and AC mains voltage, and outputs connected to the inverter 5. It is understood that both power supply system 8 and input stage 4 depend on the kind of inverter and motor to be controlled. For example, power supply system 8 and input stage 4 may be three-phases, or multi-phases, or similar.

According to the first embodiment illustrated in FIG. 3, the inverter 5 is configured to convert the DC voltage to AC voltage. The inverter 5 may be provided with a plurality of switching units (not illustrated), which are controlled by the motor controller stage 6 in order to generate and modulate an AC voltage to be fed to the motor 2. In the exemplary embodiment, the inverter 5 comprises inputs connected to outputs of the input stage 4 to receive the DC voltage and outputs connected to the electric motor 2.

According to a preferred embodiment, the rectifier unit of the input stage 4 comprises a single-phase rectification circuitry, while the inverter 5 comprises a three-phase inverter having two inputs connected to respective outputs of the rectifier unit and three outputs connected to respective terminals of the electric motor 2.

With reference to FIG. 3, the inverter-based apparatus 1 further comprises a DC-link 10, in turn comprising two DC-link lines, connecting the outputs of the input stage 4 with the inputs of the inverter 5. The inverter-based apparatus 1 further comprises a capacitor 11, a current sensor 12, and a voltage sensor 13.

The DC-link capacitor 11 is connected between the two DC-link lines of the DC-link 10, i.e. between the outputs terminals of the input stage 4. Conveniently, the DC-link capacitor 11 may have a capacitance comprised between about 1 µF and about 20 µF. The Applicant has found that using a DC-link capacitor 11 with low-capacitance has the technical effect of increasing the ripple voltage up to 100% so to have a very good harmonic content in the mains current, which allows to eliminate the power factor corrector unit.

In other words, using the DC-link capacitor 11 with low-capacitance has the advantage of removing any expensive and bulky power factor corrector circuit specifically designed for correction of harmonics (such as an inductor coupled in series between the mains output and the diode bridge input), since, due to the small capacitance of the DC-link capacitor 11, the rectified current still has a substantial harmonic content. Preferably, the DC-link capacitor 11 may comprise a film type capacitor. The film type capacitor is conveniently less expensive and more durable compared to an electrolytic capacitor. Since the inverter 5 does not comprise an electrolytic capacitor, it corresponds to an "electrolytic-capacitor-less inverter".

The current sensor 12 can be configured to sense the output currents of the inverter 5 applied to the electric motor 2. With reference to exemplary embodiment illustrated in FIG. 3, current sensor 12 may comprise one or more sensors configured to sense the currents provided to the three-phase motor 2, i.e. phase currents iu(t), iv(t), iw(t). It is understood that the time-dependence of the currents iu(t), iv(t), iw(t) is not illustrated in Figures for the sake of clarity.

The voltage sensor 13 is preferably configured to sense the voltage Vdc(t) of the DC-link capacitor 11.

With reference to FIG. 3, the motor controller stage 6 may comprise a current regulator system 14 and an active voltage limiter unit 15.

The current regulator system 14 is configured to: receive information on the sensed currents iu(t), iv(t), iw(t) from the current sensor 12, receive information on the sensed voltage Vdc(t) from the voltage sensor 13, receive information on a motor control parameter, i.e. a requested motor speed Spdref provided by an electronic control unit 110 of the machine 100, and to generate three signals Uu(t), Uv(t), Uw(t) to control the switching units (not illustrated) of the inverter 5.

The signals Uu(t), Uv(t), Uw(t) may be indicative of duty cycles of the command signals provided to the switching units of the inverter 5. The signals Uu(t), Uv(t), Uw(t) may be also per-unit signals indicative of the fraction of DC-link voltage to be applied to each phase of the motor. The three signals Uu(t), Uv(t), Uw(t) may be pulse width modulation signals (PWM).

According to an embodiment shown in FIG. 3, the current regulator system 14 may comprise: a subtractor stage 20, a speed control stage 21, a flux weakening stage 22, a currents regulator stage 23, an inverse-Park transform stage 24, an inverse-Clarke convert stage 25, a direct-Clarke convert stage 26, a direct-Park transform stage 27, and a sensor-less speed/flux position observer stage 28.

The direct-Clarke convert stage 26 is configured to convert the three-phase sensed currents iu(t), iv(t), iw(t) into a two-phase $\alpha,\beta$ Park-coordinate system (stationary reference frame), and provide current values i$\alpha$(t) and i$\beta$(t) to the direct-Park transform stage 27 and to the sensor-less speed/flux position observer stage 28.

The sensor-less speed/flux position observer stage 28 is configured to receive two current values i$\alpha$(t) and i$\beta$(t) and two signals U$\alpha$(t) and U$\beta$(t). The signals U$\alpha$(t) and U$\beta$(t) are indicative of two duty cycles values in the two-phase $\alpha,\beta$ Park-coordinate system.

The sensor-less speed/flux position observer stage 28 is further configured to provide a rotor speed signal Spd_feedback relating to the actual speed of the rotor, based on the two current values i$\alpha$(t) and i$\beta$(t) and the signals U$\alpha$(t) and U$\beta$(t). The sensor-less speed/flux position observer stage 28 is further configured to provide an angle $\theta$estimated indicative of the rotor angle estimated, based on the two current values i$\alpha$(t) and i$\beta$(t). In an exemplary embodiment, the sensor-less speed/flux position observer stage 28 may comprise a rotor angular position estimator and rotor angular speed estimator. The rotor angular position estimator may be configured to determine the angular position $\theta$estimated of the rotor based on the two current values i$\alpha$(t) and i$\beta$(t) without using a position sensor, whereas the rotor angular speed estimator may be configured to determine the rotor speed Spd_feedback based on the angular position $\theta$estimated.

The Park transform stage 27 is configured to: receive the angle $\theta$estimated and the measured current values i$\alpha$ and i$\beta$ in the two-phase $\alpha,\beta$ Park-coordinate system (stationary reference frame) and convert the current values i$\alpha$(t) and i$\beta$(t) to a two-phase d-q coordinate system (rotating-synchronous reference frame), generating the measured synchronous currents id(t) and iq(t) based on the angle $\theta$estimated.

In the exemplary embodiment, the subtractor stage 20 is configured to receive in input a motor speed signal Spd_ref and the motor speed Spd_feedback. The motor speed signal Speed-ref relates to a reference motor speed associated to a command signal indicating the requested motor speed, whereas the motor speed signal Spd_feedback relates to the determined motor speed provided by the sensor-less speed/flux position observer stage 28. The subtractor stage 20 is configured to determine a speed error based on the difference between input motor speed signals Spd_ref and Spd_feedback.

The speed control stage 21 is configured to receive the speed error and provide the current iqref. For example, the speed control stage 21 may comprise a PI controller and is configured to operate in the two-phase d-q coordinate system. The current iqref is indicative of the reference rotor current in the q-axis of the d-q coordinate system. The signals Spd_ref and Spd_feedback, iqref and idref can be, in general, time-varying signals, whose explicit time dependence is not illustrated in the notation to improve clarity of the description.

The flux weakening stage 22 is configured to: operate in the two-phase d-q coordinate system and generate a reference current idref being indicative of the reference rotor current in the d-axis of the d-q coordinate system.

With regard to the active voltage limiter unit 15, it is configured to regulate the current references supplied to the current regulator system 23 in order to limit the DC-link capacitor voltage Vdc(t) within a predetermined voltage range.

Preferably, the active voltage limiter unit 15 is configured to regulate the current references for the Id-Iq current regulators based on the DC-link capacitor voltage Vdc(t) and the measured current values id(t) and iq(t).

Conveniently, the active voltage limiter unit 15 is configured to regulate the current references for the Id-Iq current regulators without using any current measurement in the DC-link. In other words, the inverter-based apparatus 1 does not comprise any current sensor on the DC-link 10.

Preferably, the active voltage limiter unit 15 is configured to receive in inputs: the current reference iqref, the current reference idref, the voltage Vdc(t) of the DC-link capacitor 11, two signals Uq(t) and Ud(t) indicative to the duty cycles in a d-q coordinate system (hereinafter disclosed in detail) and the measured current values id(t) and iq(t) in a d-q coordinate system. The active voltage limiter unit 15 is further configured to determine two constrained axis-wise current corrections iqcorr(t) and idcorr(t) by implementing the control method hereinafter disclosed in detail.

With reference to FIG. 3, the current regulator system 14 further comprises an adder unit 30, an adder unit 31, a subtracting unit 32 and a subtracting unit 33.

The adder unit 30 is configured to: receive the current reference iqref and the q-axis-wise current correction iqcorr(t) and provide in output a modified current reference iqrefmod(t) based on the addition of the current reference iqref and the current correction iqcorr(t).

The adder unit 31 is configured to: receive the current reference idref and the d-axis-wise current correction idcorr(t) and provide in output a modified current reference idrefmod(t) based on the addition of the current reference idref and the current correction idcorr(t).

The subtracting unit 32 is configured to receive the modified current reference iqrefmod(t) and the measured current iq(t) and to provide in output the current difference Δiq(t) between the modified current reference iqrefmod(t) and the current iq(t).

The subtracting unit 33 is configured to receive the modified current reference idrefmod(t) and the measured current id(t) and to provide in output the current difference Δid(t) between the modified reference current idrefmod and the current id.

The currents regulator stage 23 is configured to receive in input the current difference Δiq(t) and the current difference Δid(t) and to provide in output the signals Uq(t) and Ud(t) respectively based on Δiq(t) and Δid(t). Signals Uq(t) and Ud(t) are indicative of the duty cycles in q-d coordinate system. Signals Uq(t) and Ud(t) may also be indicative of the fraction of maximum voltage to be applied along each axis of the synchronous d-q reference frame.

The inverse-Park transform stage 24 is configured to receive in input the signals Uq(t) and Ud(t) and to produce the signals Uα(t) and Uβ(t) indicative of the duty cycles values in the two-phase α, β Park-coordinate system. The signals Uα(t) and Uβ(t) may also be indicative of the fraction of maximum voltage to be applied along each axis of the stationary α-β reference frame.

The inverse-Clarke convert stage 25 is configured to receive in input the signals Uα(t) and Uβ(t) and to provide the switching signals Uu(t), Uv(t), Uw(t) to the inverter unit 5.

Figure 4:
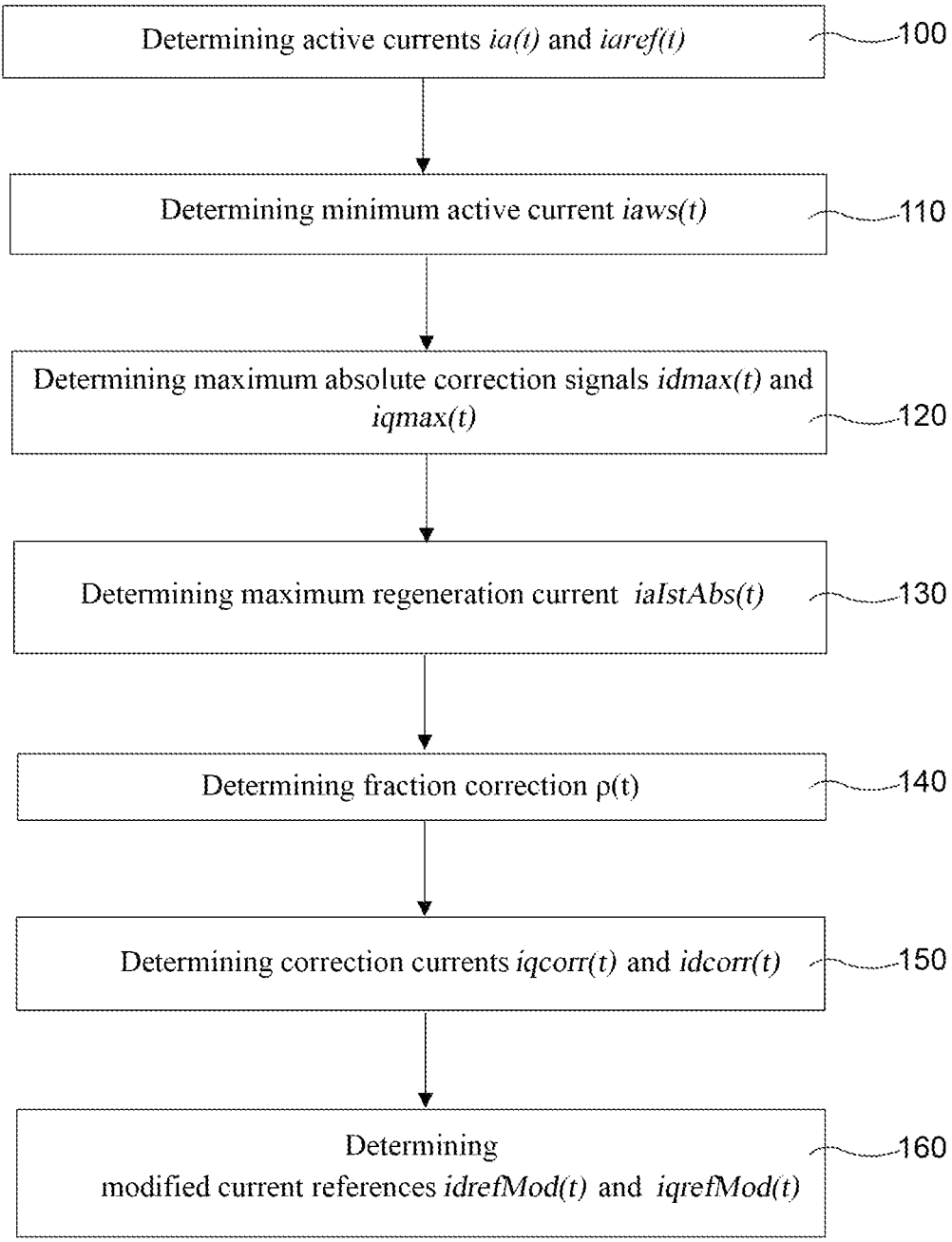
FIG. 4 is a flow chart of operation implemented by an active-voltage-limiter unit of the inverter-based apparatus illustrated in FIG. 3.

FIG. 4 is a flow chart of an exemplary control method that may be implemented by means of the active voltage limiter unit 15 (shown in FIG. 3).

In the exemplary embodiment, the active voltage limiter unit 15 is configured to implement the control method to control the current regulator system 14 in order to limit the voltage Vdc(t) of the DC-link capacitor 11 during a regeneration mode, within a predetermined voltage range.

In this respect, the control method implemented by the active voltage limiter unit 15 uses a control parameter/signal, indicated hereinafter as estimated "active current ia(t)" (estimated from available and motor phase-currents and commanded duty-cycle signals to the inverter), and the voltage Vdc(t) of the DC-link capacitor 11 to determine the current correction values iqcorr(t) and idcorr(t) to be used to modify the current references iqref and idref that current regulator system 14 uses to control the electric motor 2.

Control method performed by the active voltage limiter unit 15 controls the voltage Vdc(t) of the DC-link capacitor 11 in order to "clamp" the voltage Vdc(t) to a constant value in case, for example, the electric motor 2 tends to regenerate back-current (ip(t) becomes negative) to the DC-link capacitor 10 (i.e. during breaking of the motor). The situation of negative DC-link current ip(t)<0 can be detected through the computation of the said active current ia(t), that surrogates the unavailable current ip(t). Consequently, the method controls iqrefmod and idrefmod in order to limit the negative active current ia(t) till bringing it to zero if necessary (to completely cancel any back-current to the capacitor).

It will be disclosed hereinafter the meaning of the active current ia(t) used by the control method. Tests performed by Applicant proved that the dynamic of the DC-link capacitor 11 evolves according to the following equation:

$$d/dx Vdc(t)=(ir(t)-ip(t))/Cdc$$

When the input stage 4 is a passive uncontrolled rectifier, then the current ir(t)>0 (current that flows from the rectifier to the DC-link capacitor) is uncontrollable (and fluctuates at twice the mains frequency) and, for the small capacitance of the DC-link capacitor 11, when ir(t) by chance approaches zero, even a small negative ip(t) (regeneration current occurring in braking operation) may cause a large voltage overshoot. This situation may harm the electronic components of the motor controller stage 6, which may fail due to overvoltage.

In this respect, the control method uses the active current ia(t), which is obtained by combining the measurements of the phase currents with the duty cycle commands, to detect the regeneration (i.e., the occurrence of back-currents). Indeed the active current ia(t) can be shown by algebraic formalism to correspond to a scaled version of the current ip(t), that is, the active current ia(t) can be used in place of the current ip(t) to detect regeneration and then to take provisions to limit the capacitor voltage Vdc(t).

More specifically, in order to improve the clarity and facilitate the understanding of the present invention, but without this implying any loss of generality, it will be described hereinafter how the active current ia(t) controlled by the method according to the present invention relates to the current ip(t).

The instantaneous active power P(t), that is the power absorbed from (if P(t)>0) or supplied back to (if P(t)<0) the DC-link, may be expressed in terms of DC-link quantities:

$$P(t)=V_{dc}(t)i_p(t) \quad \text{Equation (1)}$$

The instantaneous current ip(t) absorbed from (if ip(t)>0) or supplied back/regenerated to the DC-link capacitor 11 (if ip(t)<0), can be computed by inverting equation (1):

$$i_p(t) = \frac{P(t)}{V_{dc}(t)} \qquad \text{Equation (2)}$$

The active power P(t) can also be expressed in terms of the phase currents and voltages of the motor 2 (referred to the motor's neutral point) by the scalar product:

$$P(t)=V_u(t)i_u(t)+V_v(t)i_v(t)+V_w(t)i_w(t) \qquad \text{Equation (3)}$$

wherein, by using the dq0-Park's transformation:

$$T(\theta) = \frac{2}{3}\begin{bmatrix} \cos(\theta) & \cos\left(\theta-\frac{2\pi}{3}\right) & \cos\left(\theta+\frac{2\pi}{3}\right) \\ -\sin(\theta) & -\sin\left(\theta-\frac{2\pi}{3}\right) & -\sin\left(\theta+\frac{2\pi}{3}\right) \\ \frac{1}{2} & \frac{1}{2} & \frac{1}{2} \end{bmatrix} \qquad \text{Equation (4)}$$

the active power can be expressed in terms of the d-q frame currents and voltages according to the following equation $$\begin{bmatrix} i_d(t) \\ i_q(t) \end{bmatrix} = T(\theta(t))\begin{bmatrix} i_u(t) \\ i_v(t) \\ i_w(t) \end{bmatrix}, \qquad \text{Equation (5)}$$

$$\begin{bmatrix} U_d(t) \\ U_q(t) \end{bmatrix} = T(\theta(t))\begin{bmatrix} U_u(t) \\ U_v(t) \\ U_w(t) \end{bmatrix},$$

$$P(t) = \frac{3}{2}(V_d(t)i_d(t)+V_q(t)i_q(t))+3V_0i_0.$$

Neglecting the zero-sequence current and voltage (V0,i0), the following simplified form for the active power is considered:

$$P(t) = \frac{3}{2}(V_d(t)i_d(t)+V_q(t)i_q(t)) \qquad \text{Equation (6)}$$

Considering that voltages Vd(t) and Vq(t) are applied through a standard Space Vector Modulation switching strategy, they relate to the duty cycles Ud(t) and Uq(t) [PU] by $$V_d(t) = \frac{1}{\sqrt{3}}V_{dc}U_d(t) \qquad \text{Equation (7)}$$

$$V_q(t) = \frac{1}{\sqrt{3}}V_{dc}U_q(t)$$

then it results in:

$$i_p(t) = \frac{\sqrt{3}}{2}(U_d(t)i_d(t)+U_q(t)i_q(t)) \qquad \text{Equation (8)}$$

By defining the active current iα(t):

$$i_a(t):=U_d(t)i_d(t)+U_q(t)i_q(t), \qquad \text{Equation (9)}$$

the signal can be computed by synchronous-frame currents and signals Ud(t) and Uq(t). Moreover, the following linear relation holds:

$$i_p(t) = \frac{\sqrt{3}}{2}i_a(t). \qquad \text{Equation (10)}$$

Therefore, Applicant has found that controlling the active current ia(t), in view of Equation (10), is equivalent to controlling ip(t). In particular, zeroing ia(t) corresponds to nullifying ip(t).

In case harmful regeneration is detected (negative ia(t) or increasing capacitor voltage Vdc(t)) then, as a first provision, it is possible to stop the regeneration current by nullifying ia(t).

Besides ia(t), it is possible to use another synthetic signal, named iaref(t), that gives an anticipation (forecast) on what will be the value of the active current ia(t) after the current regulators have settled. Indeed, in a motor drive with current-regulators (for id(t) and iq(t)), the currents are commanded to prescribed values idref and iqref, and the regulators are in charge of obtaining the required currents by computing suitable duty cycles, to be actuated by the inverter unit.

For a prescribed pair of reference currents, it is defined the-reference-active current-at-time-t, the signal computed with the reference currents and the duty cycles at time t:

$$i_{a_{ref}}(t)=U_d(t)i_{d_{ref}}(t)U_q(t)i_{q_{ref}}(t) \qquad \text{Equation (11)}$$

For a change in the reference currents (commanded in turn by a speed/torque controller or by a flux/weakening or magnetization block), the signal iaref(t) gives coarse forecast about what will be the active current after the transitory, since the current regulators will drive the currents toward the references.

Flow chart of FIG. 4 contains the operations performed by the active voltage limiter unit 15 to modify the current references of the current regulator system 14 in order to limit the voltage Vdc(t) of the DC-link capacitor 11 during regeneration mode, for example caused by braking or by an external sudden decrease of the load torque.

Firstly, the control method performs the step of determining the instantaneous active currents ia(t) and iaref(t) based on: the duty cycles Ud(t), Uq(t), the available currents id(t), iq(t) and the current references idref, iqref (block 100) (using the axis d and q of the Park transformation matrices).

Preferably, the control method determines the instantaneous active currents ia(t) and iaref(t) by the formulas:

$$i_a(t)=U_d(t)i_d(t)+U_q(t)i_q(t)$$

$$i_{a_{ref}}(t)=U_d(t)i_{d_{ref}}(t)+U_q(t)i_{q_{ref}}(t) \qquad \text{Equation (12a)}$$

It is understood that the active current can be computed alternatively resorting to currents and duty cycles in a reference frame different from the synchronous one, for instance using quantities expressed in the synchronous reference frame α-β, when available.

$$i_\alpha(t)=U_\alpha(t)i_\alpha(t)+U_\beta(t)i_\beta(t)$$

$$i_{\alpha_{ref}}(t)=U_\alpha(t)i_{\alpha_{ref}}(t)+U_\beta(t)i_{\beta_{ref}}(t) \qquad \text{Equation (12b)}$$

Moreover, the control method performs the step of determining a worst-case active current iaws(t) (block 110), by computing the minimum between the active currents ia(t) and iaref(t) determined by Equation (12):

$$i_{\alpha_{ws}}(t)=\min(i_\alpha(t),i_{\alpha_{ref}}(t)) \qquad \text{Equation (13)}$$

The method further performs the step of determining two maximum absolute correction signals idmax(t) and iqmax(t) (block 120), using the value iaref(t) computed by Equation (12a):

$$i_{d_{max}}(t) = \frac{i_{a_{ref}}(t)U_d(t)}{U_d(t)^2 + U_q(t)^2}$$

$$i_{q_{max}}(t) = \frac{i_{a_{ref}}(t)U_q(t)}{U_d(t)^2 + U_q(t)^2}$$

Equation (14)

Applicant has found that maximum absolute correction signals idmax(t) and iqmax(t) represent the maximum absolute corrections that yield to a zero the active current iaref(t) when subtracted entirely from the respective currents id and iq. In this respect, the modified active current computed with the modifications yields:

$$\left(i_{d_{ref}}(t) - i_{d_{max}}(t)\right)U_d(t) + $$

$$\left(i_{q_{ref}}(t) - i_{q_{max}}(t)\right)U_q(t) = $$

$$= i_{d_{ref}}(t)U_d(t) + i_{q_{ref}}(t)U_q(t) - $$

$$\frac{i_{a_{ref}}(t)U_d(t)^2}{U_d(t)^2 + U_q(t)^2} - \frac{i_{a_{ref}}(t)U_q(t)^2}{U_d(t)^2 + U_q(t)^2}$$

$$= i_{a_{ref}}(t) - i_{a_{ref}}(t)\frac{U_d(t)^2 + U_q(t)^2}{U_d(t)^2 + U_q(t)^2}$$

$$= 0$$

Applicant has found that that nullifying the active current ia(t) corresponds to completely stop any regeneration of current. Applicant has found that to avoid overvoltage, it is not necessary to apply the maximum corrections. Only a fraction of idmax(t) and iqmax(t) may be conveniently applied, depending on a voltage level and on some user-defined tuning parameters. Indeed, depending on the voltage level, the active current ia(t) can take also small negative values (that is, to regenerate) with bottom limit—iaIstAbs(t), wherein iaIstAbs(t) is an absolute value computed at next step.

Furthermore, the method performs the step of determining the instantaneous maximum allowable regeneration current iaIstAbs(t) (block 130) based on the measured voltage level and a prefixed parameter iaMaxAbs corresponding to a maximum absolute active current for regeneration, for example defined by the user:

$$i_{a_{IstAbs}}(t) = \omega_v(t)i_{a_{MaxAbs}}$$

Equation (15)

wherein ωv (t) is a weight coefficient that depends on the voltage Vdc(t) and the nominal DC-link voltage Vdcnom and on the highvoltage limit Vhigh. For example, weight coefficient ωv (t) may be 1 if voltage Vdc(t) is below the nominal DC-link voltage Vdcnom, weight coefficient wV(t) may be 0 if voltage Vdc(t) is above highvoltage limit Vhigh. The method may decreases the weight coefficient ωv (t) linearly from 1 to 0 as the DC-link capacitor voltage Vdc(t) changes in a prefixed range comprised between nominal DC-link voltage Vdcnom to high-voltage limit Vhigh.

$$w_v(t) = sat\left[\frac{V_{high} - V_{dc}(t)}{V_{high} - V_{dc_{num}}}\right]_0^1$$

Example (16)

Furthermore, the method determines the negative fraction of correction to be applied according, for example, to the empirical saturated-cubic Equation (block 140):

$$\rho(t) = sat\left[\left(\frac{i_{a_{ws}}(t) + i_{a_{IstAbs}}(t)}{i_{a_{IstAbs}}}\right)^3\right]_{-1}^0$$

Example (17)

It is understood that when there is regeneration, the current iaws(t) is negative. Therefore only for active currents ia(t) below the instantaneous limit—iaIstAbs(t), the fraction ρ(t) counts negative and different from zero.

Furthermore, the method determines the unconstrained d-q axis-wise corrections as a fraction of the maximum correction by the following Equation (block 150):

$$i_{d_{unc}}(t) = \rho(t)i_{d_{max}}(t)$$

$$i_{q_{unc}}(t) = \rho(t)i_{q_{max}}(t)$$

Equation (18)

Furthermore, the method determines the constrained d-q axis-wise current corrections by applying the following saturation and correction Equations (block 160):

$$i_{qcorr}(t) = \begin{cases} \max(i_{qunc}(t), 0) & \text{if } \omega(t) > 0 \\ \min(i_{qunc}(t), 0) & \text{if } \omega(t) < 0 \end{cases}$$

Equation (19)

$$i_{d_{corr}}(t) = \min(i_{d_{unc}}(t), 0) - K_{qd} \, abs(i_{q_{corr}}(t) - i_{q_{unc}}(t))$$

Equation (20)

wherein Kqd is a positive tuning gain that may be used to transfer to the d-axis part of the correction originally computed for the q-axis, when saturation occurs.

For example, when the motor speed is positive, the method may only permit the q-axis correction to negative and vice-versa.

The method can perform a d-axis correction that is negative and amplified in case the constrained q-axis correction is different from the unconstrained one.

Furthermore, the method may determine the modified current references for the current regulators (block 160) by the adders 30, 31:

$$i_{d_{refMod}}(t) = i_{d_{ref}}(t) + i_{d_{corr}}(t)$$

$$i_{q_{refMod}}(t) = i_{q_{ref}}(t) + i_{q_{corr}}(t)$$

Equation (21)

The advantages resulting from the use of the active voltage limiter unit 15 in the inverter-based apparatus 1 are remarkable.

The active voltage limiter unit has the technical effect of reducing the magnitude of the active current to zero when current starts to became negative, by modifying the current parameters through rotation of the controlled current vector.

Moreover, the capacitor-less inverter-based apparatus is less expensive and less bulky compared to the known inverter-based apparatus. Indeed inverter-based apparatus limits harmonics without usage of dedicated circuitry (PFC), increasing the lifetime expectation of the inverter thanks to, for example, the usage of a film capacitor instead of an electrolytic type. Moreover, capacitor-less inverter-based apparatus reduces EMC emission due to the limited voltage applied during switching.

Clearly, changes and variations may be made to the inverter-based apparatus and to the controlling method without, however, departing from the scope of the present invention.

Figure 5:
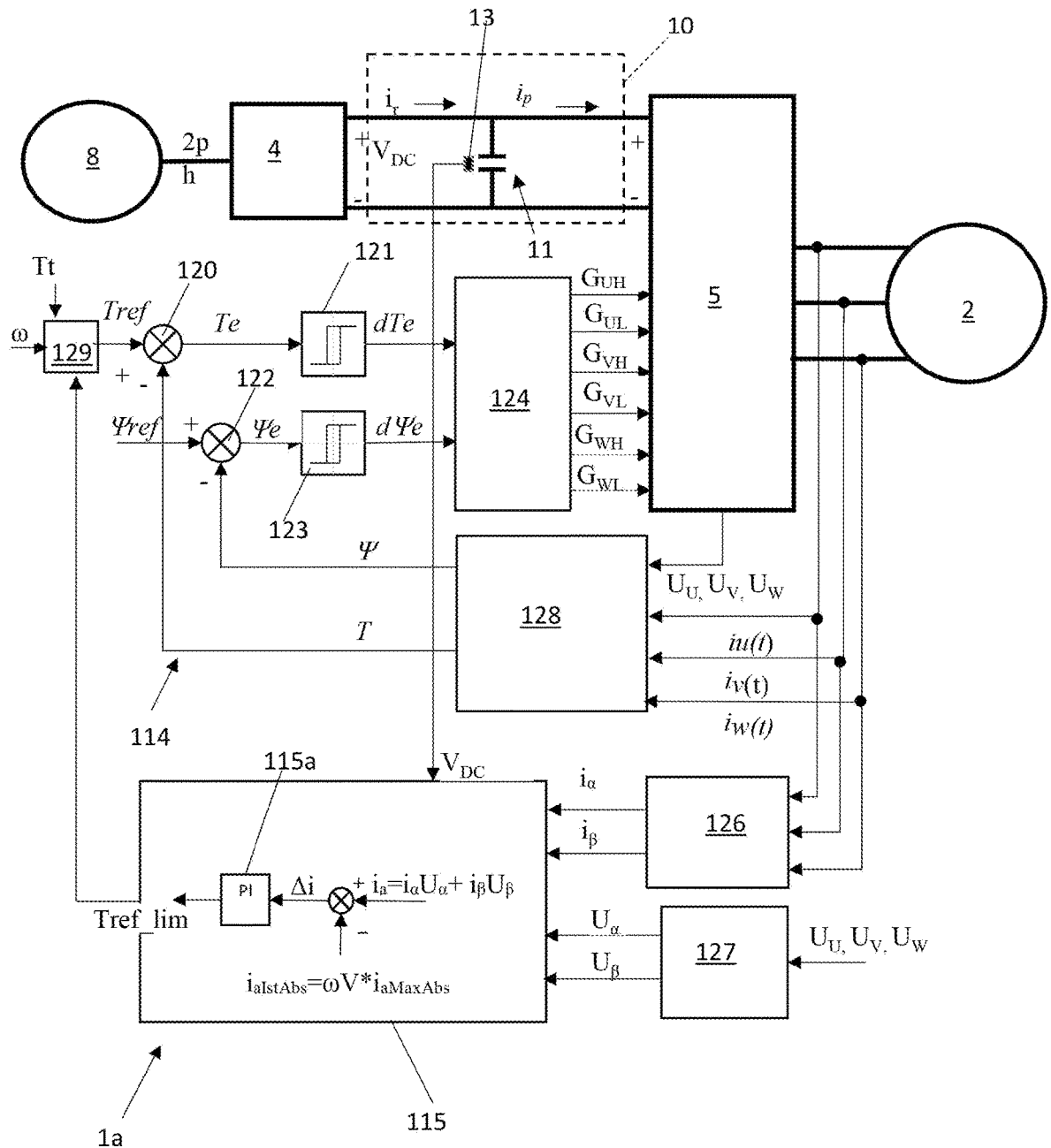
FIG. 5 is a block diagram of an inverter-based apparatus provided according to a second embodiment of the present disclosure.

FIG. 5 illustrates a second embodiment of an inverter-based apparatus 1a, which is similar to the inverter-based apparatus 1 shown in FIG. 3 and the component parts of which will be designated, where possible, by the same reference numbers as those that designates corresponding parts of the inverter-based apparatus 1.

With reference to FIG. 5, the inverter-based apparatus 1a differs from the inverter-based apparatus 1 shown in FIG. 3 because: the current regulator system 14 of the motor controller stage 6 is replaced with a sensor-less torque/flux regulator system 114, and the active voltage limiter unit 15 is replaced with an active voltage limiter unit 115, which cooperates with the sensor-less torque/flux regulator system 114 in order to regulate the torque reference Tref used by the sensor-less torque/flux regulator system 114 itself to control the switching units of the inverter 5, as hereinafter disclosed in detail.

Furthermore, the inverter-based apparatus 1a differs from the inverter-based apparatus 1 shown in FIG. 3 because it comprises a voltage direct-Clarke convert stage 127 and a comparator 129, which will be hereinafter disclosed in detail.

According to the second embodiment illustrated in FIG. 5, the sensor-less torque/flux regulator system 114 is configured to receive in input information on the three-phase sensed currents iu(t), iv(t), iw(t). Moreover, the sensor-less torque/flux regulator system 114 is configured to receive in input information on signals Uu(t), Uv(t), Uw(t) above disclosed in detail for the first embodiment illustrated in FIG. 3, and receive information on the sensed voltage Vdc(t) provided by the voltage sensor 13.

The sensor-less torque/flux regulator system 114 is further configured to receive information on motor control values/parameters, i.e. a torque reference Tref and a flux reference Tref.

The torque reference Tref may depend on a target torque Tt provided by means of an electronic control unit 110 of the laundry treating machine 100, illustrated in FIG. 2. For example, the electronic control unit 110 may be configured to control the operating of laundry washing machine based on the selected laundry treating program. Preferably, the electronic control unit 110 may be configured to provide the target torque Tt which is regulated (instant by instant) on the basis of the laundry treating program which the laundry treating machine 100 is performing. Preferably, the target torque Tref may correspond to the motor corresponding to the torque to be provided to the drum 104.

The flux reference Tref may be provided by means of an electronic control unit 110 of the laundry treating machine 100. Preferably the electronic control unit 110 may be configured to provide the flux reference Tref depending on the laundry treating program which the laundry treating machine 100 is performing.

The sensor-less torque/flux regulator system 114 is further configured to provide a plurality of inverter control signals, preferably six inverter control signals $G_{UH}(t)$, $G_{UL}(t)$, $G_{VH}(t)$, $G_{VL}(t)$, $G_{WH}(t)$, $G_{WL}(t)$ (schematically illustrated in FIG. 5). It is understood that inverter control signals $G_{UH}(t)$, $G_{UL}(t)$, $G_{VH}(t)$, $G_{VL}(t)$, $G_{WH}(t)$, $G_{WL}(t)$ are configured to control the switching units of the inverter 5. For example inverter control signals $G_{UH}(t)$, $G_{UL}(t)$, $G_{VH}(t)$, $G_{VL}(t)$, $G_{WH}(t)$, $G_{WL}(t)$ may be indicative of duty cycles of the command signals provided to the switching units (not illustrated) of the inverter 5. The inverter control signals $G_{UH}(t)$, $G_{UL}(t)$, $G_{VH}(t)$, $G_{VL}(t)$, $G_{WH}(t)$, $G_{WL}(t)$ may be also per-unit signals indicative of the fraction of DC-link voltage to be applied to each phase of the electric motor 6. It is understood that inverter control signals $G_{UH}(t)$, $G_{UL}(t)$, $G_{VH}(t)$, $G_{VL}(t)$, $G_{WH}(t)$, $G_{WL}(t)$ may be associated to the pulse width modulation signals (PWM).

According to the second embodiment shown in FIG. 5, the sensor-less torque/flux regulator system 114 may preferably comprise: a subtractor stage 120, a torque hysteresis control stage 121, a subtractor stage 122, a flux hysteresis control stage 123, a switching table stage 124 and a sensor-less torque/flux estimator stage 128.

The sensor-less torque/flux estimator stage 128 may be configured to: receive in input the currents iu(t), iv(t), iw(t), receive in input the signals Uu(t), Uv(t), Uw(t), estimate a torque signal T based on the three-phase sensed currents iu(t), iv(t), iw(t), and signals Uu(t), Uv(t), Uw(t), and output the estimated torque signal T. The estimated torque signal T comprise a value indicative of the actual torque of the electric motor 2 during the rotation of the drum 104. Preferably, the estimated torque signal T comprise a value indicative of the actual torque on the motor shaft of the electric motor 2.

The sensor-less torque/flux estimator stage 128 may be further configured to: estimate a flux signal $\Psi$ based on the three-phase sensed currents iu(t), iv(t), iw(t), and signals Uu(t), Uv(t), Uw(t), and output the estimated flux signal $\Psi$. The estimated flux $\Psi$ is indicative of the actual magnetic flux of the electric motor 2 during the rotation of the drum 104.

It is understood that operations performed by the sensor-less torque/flux estimator stage 128 to estimate the actual magnetic flux $\Psi$ and the actual torque T of the electric motor 6 based on the motor-currents iu(t), iv(t), iw(t), and signals Uu(t), Uv(t), Uw(t), are known and will not be further described.

With reference to FIG. 5, the subtractor stage 120 is configured to: receive in input the torque reference Tref and the estimated motor torque T, determine a torque error Te based on the difference between the torque reference Tref and the estimated motor torque T, and outputs the calculated torque error Te.

The torque hysteresis control stage 121 is configured to receive the torque error Te and provides a torque control signal dTe.

According to an exemplary embodiment, the torque hysteresis control stage 121 may comprise a plurality of level hysteresis controllers. For example, the torque hysteresis control stage 121 may comprise three prefixed torque control signals dTe(i) (wherein i is the index from 1 to 3) having respective values, and selectively outputs one torque control signal dTe among the three prefixed torque control signals dTe(i) based on the received torque error Te.

The subtractor stage 122 is configured to: receive in input the reference flux $\Psi$ref and the estimated flux $\Psi$, determine a flux error $\Psi$e based on the difference between the reference flux $\Psi$ref and the estimated flux $\Psi$, and outputs the calculated flux error $\Psi$e.

The flux hysteresis control stage 123 is configured to receive the flux error $\Psi$e and provide a flux control signal d$\Psi$e.

Preferably, the flux hysteresis control stage 123 may comprise a plurality of level hysteresis controllers. For example, the flux hysteresis control stage 123 may comprise two prefixed flux control signals d$\Psi$e(i) (wherein i is the index from 1 to 2) having respective values, and selectively outputs a flux control signal d$\Psi$e among said two prefixed flux control signals d$\Psi$e(i) based on the received flux error $\Psi$e.

It is understood that signals associated with: torque reference Tref, the estimated motor torque T, the estimated flux Ψ, and the reference flux Ψref may be any time-varying electric signals.

With regard to the switching table unit 124, it is configured to: receive in input the flux control signal dΨe and the torque control signals dTe, and determine the inverter control signals $G_{UH}(t)$, $G_{UL}(t)$, $G_{VH}(t)$, $G_{VL}(t)$, $G_{WH}(t)$, $G_{WL}(t)$ based on flux control signal dΨe and the torque control signals dTe.

Preferably, the switching table unit 124 may be configured to perform switching voltage vector systems/algorithms. Preferably, switching voltage vectors algorithms may comprise eight different switching voltage vectors consisting of eight respective different configuration of the inverter signals $G_{UH}(t)$, $G_{UL}(t)$, $G_{VH}(t)$, $G_{VL}(t)$, $G_{WH}(t)$, $G_{WL}(t)$. Preferably, each of vectors $G_{UH}(t)$, $G_{UL}(t)$, $G_{VH}(t)$, $G_{VL}(t)$, $G_{WH}(t)$, $G_{WL}(t)$ may be regulated based on flux control signal dΨe and the torque control signals dTe.

The direct-Clarke convert stage 127 is configured to convert the three-phase voltage signals Uu(t), Uv(t), Uw(t), to a two-phase α, β Park-coordinate system (stationary reference frame), and outputs voltage signals Uα(t) and Uβ(t) indicative of duty cycles of the switching unit of the inverter 5. The direct-Clarke convert stage 126 is configured to convert the three-phase sensed currents iu(t), iv(t), iw(t), to a two-phase α,β Park-coordinate system (stationary reference frame), and outputs current values iα(t) and iβ(t).

With reference to the second embodiment illustrated in FIG. 5, the active voltage limiter unit 115 is configured to receive in inputs: current signals iα(t), current signal iβ(t), the signal Uα(t) in the two-phase α,β Park-coordinate system, the signal Uβ(t) in the two-phase α,β Park-coordinate system, and the voltage Vdc(t) of the DC-link capacitor 11.

The active voltage limiter unit 115 is configured to provide a torque limit Tref_lim signal based on the current signal iα(t), the current signal iβ(t), the voltage signal Uα(t), the voltage signal Uβ(t), and the voltage Vdc(t), by implementing the method hereinafter disclosed.

Preferably, the active voltage limiter unit 115 is configured to regulate the torque reference Tref based on the torque limit Tref_lim in order to limit the DC-link capacitor voltage Vdc(t) within a predetermined voltage range.

According to a preferred embodiment illustrated in FIG. 5, the active voltage limiter unit 115 is configured to calculate the active current ia(t) by performing the equation 12b):

$$ia(t)=i\alpha(t)*U\alpha(t)+i\beta(t)*U\beta(t)$$

Furthermore, the active voltage limiter unit 115 is configured to calculate the instantaneous maximum allowable regeneration current iaIstAbs(t) according to the equation (15).

More specifically the maximum allowable regeneration current iaIstAbs(t) is calculated based on the measured voltage level and the prefixed parameter iaMaxAbs corresponding to a maximum absolute active current ia(t) for regeneration $$iaIst\,Abs(t)=\omega V*IaMaxAbs$$

wherein ωV is a weight coefficient that depends on the voltage Vdc(t) and a nominal DC-link voltage Vdcnom and on a high voltage limit Vhigh. For example, weight coefficient ωV may be 1 if voltage Vdc(t) is below the nominal DC-link voltage Vdcnom, weight coefficient wV(t) may be 0 if voltage Vdc(t) is above high voltage limit Vhigh. The method may decrease the weight coefficient ωV linearly from 1 to 0 as the DC-link capacitor voltage Vdc(t) changes in a prefixed range comprised between nominal DC-link voltage Vdcnom to high-voltage limit Vhigh. The active voltage limiter unit 115 is further configured to calculate a value Δi indicative of the difference between the active current ia(t) and the maximum allowable regeneration current iaIstAbs(t):

$$\Delta i = ia(t)-iaIst\,Abs(t)$$

The active voltage limiter unit 115 may also comprise a proportional-integral regulator 115a, which receives the value Δi, performs a proportional-integral function (PI function) on the value Δi to calculate the torque limit Tref_lim used to regulate the torque reference Tref.

The proportional-integral regulator 115a of the active voltage limiter unit 115 provides the calculated torque limit Tref_lim in input to the comparator 129.

The comparator 129 is configured to: receive in input the torque target Tt preferably from the electronic control unit 110, receive in input the torque limit Tref_lim from the active voltage limiter unit 115, receive in input the motor speed ω, compare the torque target Tt with the torque limit Tref_lim, and set the torque reference Tref based on the satisfied condition among the following four conditions:

$$\text{if } \omega > 0 \quad T_{ref}(t) = \begin{cases} T_t(t) & \text{if } T_t(t) > T_{ref\_lim}(t) \\ T_{ref_{lim}}(t) & \text{if } T_t(t) \leq T_{ref\_lim}(t) \end{cases}$$

$$\text{if } \omega < 0 \quad T_{ref}(t) = \begin{cases} T_t(t) & \text{if } T_t(t) < T_{ref\_lim}(t) \\ T_{ref_{lim}}(t) & \text{if } T_t(t) \geq T_{ref\_lim}(t) \end{cases}$$

More specifically:

when the motor speed ω is positive (ω>0) and the torque target Tt(t) is greater than torque limit Tref_lim (t), the comparator 129 is configured to set the torque reference Tref(t) with the torque target Tt(t), i.e. performs Tref(t)=Tt(t);

when the motor speed ω is positive and torque target Tt(t) is lower or equal to torque limit Tref_lim(t), the comparator 129 is configured to set the torque reference Tref(t) with the torque limit Tref_lim(t), i.e. performs Tref(t)=Tref_lim (t). Moreover, when the motor speed ω is negative (ω<=0) and the torque target Tt(t) is lower than torque limit Tref_lim(t), the comparator 129 is configured to set the torque reference Tref with the torque target Tt(t), i.e. performs Tref(t)=Tt(t);

when the motor speed ω is negative (ω<=0) and the torque target Tt(t) is greater than, or equal to, the torque limit Tref_lim(t), the comparator 129 is configured to set the torque reference Tref(t) with the torque limit Tref_lim(t), i.e. perform Tref(t)=Tref_lim(t).

The technical effect of the active voltage limiter unit 115 is to cause a regulation of the torque control signals dTe by the torque hysteresis control stage 121, without using any current sensor on the DC-link 10.

It is pointed out that that in the second embodiment illustrated in FIG. 5, the active current calculation is performed as ia(t)=iα(t)Uα(t)+iβ(t)Uβ(t), but instead of using it to determine new direct and quadrature current references (idrefMod(t), iqrefMod(t)), the estimated active current ia(t) is subtracted from the maximum allowable regeneration current iaIstAbs(t) and then fed in to the proportional integral regulator 115a that outputs the value Tref_lim corresponding to an inferior limit to be assigned to the torque reference Tref.

As well explained in the first embodiment illustrated in FIG. 3, iaIstAbs(t) is weighted from a prefixed parameter iaMax- Abs corresponding to the maximum absolute active current for regeneration, that is iaIstAbs(t)=ωV(t)iaMaxAbs.

It is understood that further generalization of the method may consist of extending the active voltage limiter method to any algorithms that measure and or estimate the motor phase current and correlate the estimated active current, calculated from the motor phase current as described above, for the first embodiment, to one or more controlled variables that acts on the inverter switch units, causing the DC link voltage Vdc(t) to be clamped to the prefixed value, during the regenerative phase of the electric motor 2.

It is pointed out that both embodiments, i.e. inverter-based apparatus 1 and 1a, have the technical effect of implement an active clamping of the regenerated DC link current by directly measuring and/or estimating the DC link current and without short the bottom/upper switches. This solve the technical problem of the inverter-based apparatus used in the laundry treating machines, which are characterized by time-varying load and/or by a rapid change of target speed, and are affected by over-voltage spike in DC link caused by the energy regenerated form the motor.

For example we may consider a laundry washing machine equipped with an electrical motor controlled by a inverter having electrolytic capacitor, running at regimes lower than the motor base speed (that is the speed at which the motor produce the maximum power and torque). In this condition, the inverter operates safely without any issue of energy regenerated back to the DC link from the electrical motor. However this condition is not valid for the electrolytic capacitor-less inverter of the present invention, wherein the small capacitance value limit the maximum voltage applied to the electric motor and lower the motor base speed.

Moreover, over the missing filtering effect of a big tank, like an electrolytic capacitor, increase the possibility to have over voltage spike in the DC link when high unbalance load is present inside the drum.

The above disclosed inverter-based apparatus 1 and 1a used in the laundry treating machine 100 overcome this problem by implementing the active clamping of the regenerated DC link current by directly estimating the DC link current and without short the bottom/upper switches.

Figure 6:
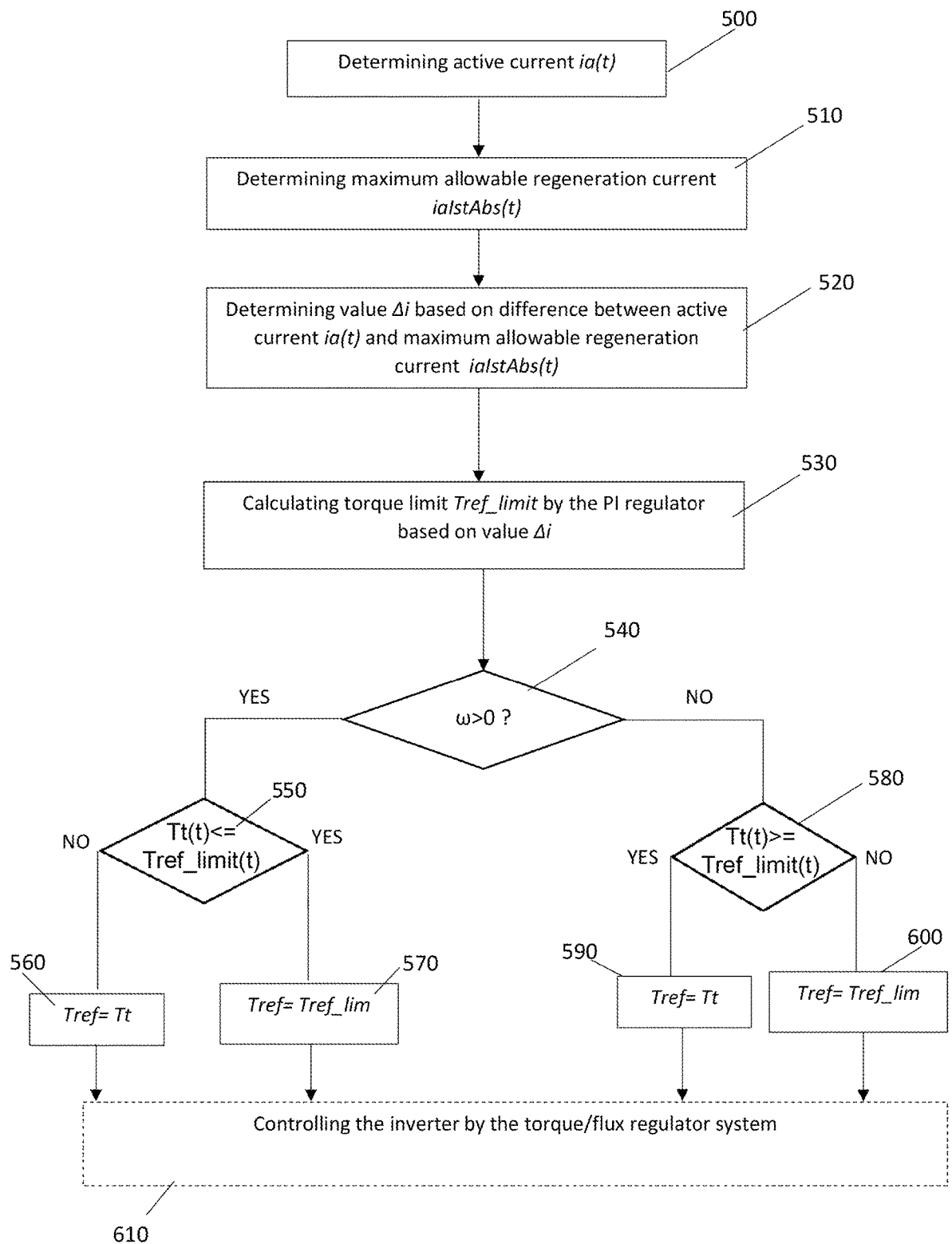
FIG. 6 is a flow chart of operations implemented by an active voltage limiter unit of the inverter-based apparatus illustrated in FIG. 5.

FIG. 6 is a flow chart of an exemplary control method that may be implemented by the active voltage limiter unit 115 of the inverter-based apparatus 1a of the laundry-treating machine 100 to determine the torque limit Tref_lim according to the second embodiment of the present invention.

In the exemplary embodiment, the active voltage limiter unit 115 is configured to implement the method to control the sensor-less torque/flux regulator system 114 in order to limit the voltage Vdc(t) of the DC-link capacitor 11 during a regeneration mode within a predetermined voltage range. In this respect, the control method implemented by the active voltage limiter unit 115 uses the estimated active current iα(t) and the maximum allowable regeneration current iaIstAbs(t) to calculate the limit torque Tref limit which is provided as torque reference Tref to the sensor-less torque/flux regulator system 114 when the target torque Tt is greater than the limit torque Tref limit.

Firstly, the control method performs the step of determining the active current ia(t) based on the equation 12b)

$$ia(t)=I\alpha(t)*U\alpha(t)+I\beta(t)*U\beta(t) \text{(block 500)}$$

Furthermore, the control method calculates the instantaneous maximum allowable regeneration current iaIstAbs(t) (block 510) based on the measured voltage level and the prefixed parameter IaMaxAbs corresponding to the maximum absolute active current ia(t) for regeneration, $$iaIst\ Abs(t)=\omega_r(t) I_{aMaxAbs}$$

Furthermore the control method calculates the value Δi (block 520) indicative of the difference between the active current ia(t) and the maximum allowable regeneration current iaIstAbs(t):

$$\Delta i = ia(t) - iaIst\ Abs(t)$$

Furthermore, the control method calculates the torque limit Tref_lim by the proportional-integral regulator 115a on the basis of value Δi (block 530).

Furthermore, the control method controls whether the motor speed ω is positive (block 540). When the motor speed ω is positive (ω>0) (Output YES block 540) and the torque target Tt(t) is greater than torque limit Tref_lim (t) (Output NO block 550), the method sets the torque reference Tref(t) with the torque target Tt(t), i.e. performs Tref(t)=Tt (t) (block 560).

When the motor speed ω is positive (Output YES block 540) and torque target Tt(t) is lower or equal to torque limit Tref_lim(t) (output YES block 550), the method sets the torque reference Tref(t) with the torque limit Tref_lim(t)), i.e. performs Tref(t)=Tref_lim (t) (block 570). In this case, the active voltage limiter 115 limits the DC-link capacitor voltage within the predetermined voltage range by imposing the torque limit Tref_lim as torque reference used by the torque/flux regulator system 114 (block 610).

Moreover, when the motor speed ω is negative (ω<0) (output NO block 540) and the torque target Tt(t) is lower than torque limit Tref_lim(t) (Output YES block 580), the method sets the torque reference Tref with the torque target Tt(t), i.e. performs Tref(t)=Tt(t)(block 590).

Moreover, when the motor speed ω is negative (ω<0) (Output NO block 540) and the torque target Tt(t) is greater than, or equal to, the torque limit Tref_lim(t) (Ouput NO block 580), the method sets the torque reference Tref(t) with the torque limit Tref_lim(t), i.e. perform Tref(t)=Tref_lim(t) (block 600). In this case, the active voltage limiter 115 limits the DC-link capacitor voltage within the predetermined voltage range by imposing the torque limit Tref_lim as torque reference used by the torque/flux regulator system 114 (block 610).

The invention claimed is:

1. A laundry treating machine comprising:
    a casing,
    a laundry drum mounted inside said casing to rotate about a rotation axis,
    an electric motor configured to rotate said laundry drum about said rotation axis,
    an inverter-based apparatus configured to control said electric motor and comprising:
        an input stage configured to be connected to mains lines for receiving AC lines currents and AC mains voltage and configured to convert said alternating mains voltage AC to a rectified DC voltage,
        an electrolytic capacitor-less inverter configured to generate output currents to be fed to said electric motor based on duty cycles of switching signals,
        a DC-link which connects said electrolytic capacitor-less inverter to said input stage and is crossed by DC-link currents from, or towards, said electrolytic capacitor-less inverter,
        a DC-link capacitor connected to said DC-link,
        a regulator system which is configured to control the duty cycles of switching signals based on at least a determined/estimated motor value (Id,Iq),(T) indicative of a controlled parameter of said electric motor, and at least a motor reference value (Idref,Iqref), (Tref), which is associated to said controlled parameter of said electric motor, and wherein said inverter-based apparatus further comprises an active voltage limiter unit, which is configured to regulate said motor reference value (Idref, Iqref),(Tref) in order to limit the DC-link capacitor voltage (Vdc(t)) within a predetermined voltage range.

2. The laundry treating machine according to claim 1, wherein:

said determined/estimated motor values correspond to said output currents (iu, iv, iw);

said motor reference values correspond to said current references (idref, iqref); and said laundry treating machine comprises:

voltage sensor means configured to determine the amplitude of said DC-link capacitor voltage (Vdc(t)), current sensor means configured to determine the amplitude of output currents (iu, iv, iw) provided to said electric motor by said electrolytic capacitor-less inverter, wherein said regulator system is configured to control said duty cycles of the switching units of said electrolytic capacitor-less inverter based on said output currents (iu, iv, iw) and said current references (idref, iqref), and wherein said active voltage limiter unit is configured to regulate said current references (idref, iqref) of said regulator system in order to cause said DC-link capacitor voltage (Vdc(t)) to be limited within said predetermined voltage range.

3. The laundry treating machine according to claim 2, wherein said active voltage limiter unit is further configured to regulate said current references (idref, iqref) of said regulator system in order to cause said DC-link capacitor voltage (Vdc(t)) to be limited within said predetermined voltage range, without using said lines currents and/or DC-link currents.

4. The laundry treating machine according to claim 2, wherein said active voltage limiter unit is further configured to clamp said DC-link capacitor voltage (Vdc(t)) to a prefixed value, when said electric motor regenerates back current to said the DC-link capacitor via said electrolytic capacitor-less inverter.

5. The laundry treating machine according to claim 2, wherein said active voltage limiter unit is further configured to:

determine an active current (ia)(iaref) based on said output currents (iu, iv, iw) and said duty cycles; and regulate said current references (idref, iqref) based on said active current (ia)(iaref) and said DC-link capacitor voltage (Vdc(t)).

6. The laundry treating machine according to claim 5, wherein said active voltage limiter unit is further configured to determine a first active current (ia) based on the d-q axis-wise duty cycles (Ud, Uq) which are indicative of said duty cycles of the switching signals and d-q axis-wise currents (id, iq) indicative of said output currents (iu, iv, iw).

7. The laundry treating machine according to claim 5, wherein said active voltage limiter unit is configured to determine a second active current (iaref) based on the d-q axis-wise duty cycles (Ud, Uq) indicative of said duty cycles of the switching signals and said determined current references (idref, iqref).

8. The laundry treating machine according to claim 5, wherein:

said active voltage limiter unit is further configured to determine a first active current (ia) based on the d-q axis-wise duty cycles (Ud, Uq) which are indicative of said duty cycles of the switching signals and d-q axis-wise currents (id, iq) indicative of said output currents (iu, iv, iw);

said active voltage limiter unit is configured to determine a second active current (iaref) based on the d-q axis-wise duty cycles (Ud, Uq) indicative of said duty cycles of the switching signals and said determined current references (idref, iqref); and said active voltage limiter unit is further configured to determine said active current (ia(t))(iaref(t)) by computing a minimum current (iaws) between said first (ia(t)) and second active currents (iaref(t)).

9. The laundry treating machine according to claim 8, wherein said active voltage limiter unit is further configured to determine two maximum absolute correction signals (idmax(t)),(iqmax(t) on the basis of said second active current (iaref) and said d-q axis-wise duty cycles (Ud, Uq).

10. The laundry treating machine according to claim 9, wherein said active voltage limiter unit is further configured to determine an instantaneous maximum allowable regeneration current (iaIstAbs) based on a measured voltage level and a parameter (iaMaxAbs) indicative of a maximum absolute active current for regeneration.

11. The laundry treating machine according to claim 10, wherein said active voltage limiter unit is further configured to determine said instantaneous maximum allowable regeneration current (iaIstAbs) based on the following equation $$i_{a_{IstAbs}}(t) = \omega_V(t) i_{a_{MaxAbs}}$$

wherein where $\omega_V(t)$ is a weight coefficient that depends on: said DC-link capacitor voltage Vdc(t), a nominal DC-link voltage (Vdcnom), and a predetermined high-voltage limit (Vhigh).

12. The laundry treating machine according to claim 11, wherein said active voltage limiter unit is further configured to determine a negative fraction of correction to be applied according to an empirical saturated-cubic equation:

$$\rho(t) = sat\left[\left(\frac{i_{a_{ws}}(t) + i_{a_{IstAbs}}(t)}{i_{a_{IstAbs}}}\right)^3\right]_{-1}^{0}.$$

13. The laundry treating machine according to claim 12, wherein said active voltage limiter unit is further configured to determine unconstrained axis-wise corrections as a fraction of the maximum correction by the following equation:

$$i_{d_{unc}}(t) = \rho(t) i_{d_{max}}(t)$$

$$i_{q_{unc}}(t) = \rho(t) i_{q_{max}}(t).$$

14. The laundry treating machine according to claim 13, wherein said active voltage limiter unit is further configured to determine constrained axis-wise current corrections by applying the following saturation and correction equations $$t_{qcorr}(t) = \begin{cases} \max(t_{qunc}(t), 0) & \text{if } \omega(t) > 0 \\ \min(t_{qunc}(t), 0) & \text{if } \omega(t) < 0 \end{cases}$$

$$i_{d_{corr}}(t) = \min(i_{d_{unc}}(t), 0) - K_{qd} \, abs(i_{q_{corr}}(t) - i_{q_{unc}}(t)$$

wherein:
Kqd is a positive tuning gain that may be used to transfer to the d-axis part of the correction originally computed for the q-axis, when saturation occurs, and idunc and iqunc are said axis-wise current corrections.

15. The laundry treating machine according to claim 14, wherein said active voltage limiter unit is configured to modify said current references according to the following equations:

$$i_{d_{refMod}}(t)=i_{d_{ref}}(t)+i_{d_{corr}}(t)$$

$$i_{q_{refMod}}(t)=i_{q_{ref}}(t)+i_{q_{corr}}(t).$$

16. The laundry treating machine according to claim 1, wherein
said determined/estimated motor values correspond to an estimated torque (T) of said electric motor;
said motor reference values correspond to a torque reference (Tref);
said regulator system is configured to receive said estimated torque (T) and said torque reference (Tref) and control the switching units of said electrolytic capacitor-less inverter based on said estimated torque (T) and said torque reference (Tref) and
said active voltage limiter unit is configured to regulate said torque reference (Tref) of said regulator system in order to cause said DC-link capacitor voltage (Vdc(t)) to be limited within said predetermined voltage range.

17. The laundry treating machine according to claim 16, wherein said active voltage limiter unit is configured to regulate said torque reference (Tref) of said regulator system in order to cause said DC-link capacitor voltage (Vdc(t)) to be limited within said predetermined voltage range, without using said lines currents and/or DC-link currents.

18. The laundry treating machine according to claim 17, wherein said active voltage limiter unit is configured to:
receive first voltage signals (Uα(t), Uβ(t)) indicative of the duty cycles of said switching signals;
receive first current signals (iα(t),iβ(t)) indicative of said output currents (iu, iv, iw) provided to said electric motor;
receive said voltage (Vdc(t)) of the DC-link capacitor; and
determine a torque limit value (Tref_lim) based on said first voltage signals (Uα(t), Uβ(t)), said first current signals (iα(t),iβ(t)), and said voltage (Vdc(t)) of the DC-link capacitor.

19. The laundry treating machine according to claim 18, wherein said active voltage limiter unit is configured to:
determine an active current (ia(t)) based on said first voltage signals (Uα(t), Uβ(t)) and said first current signals (iα(t),iβ(t));
determine an instantaneous maximum allowable regeneration current (iaIstAbs(t)) based on the measured voltage level and the prefixed parameter (iaMaxAbs) corresponding to a maximum absolute active current (ia(t)) for regeneration by means of the following equation:

$$iaIstAbs(t)=\omega V*IaMaxAbs,$$

wherein ωV is a weight coefficient that depends on the voltage Vdc(t) and a nominal DC-link voltage Vdcnom and on a highvoltage limit Vhigh;
calculate a current value (Δi) indicative of the difference between said active current (ia(t)) and said maximum allowable regeneration current (iaIstAbs(t)); and
perform a proportional-integral function on said current value (Δi) to calculate said torque limit (Tref_lim).

20. The laundry treating machine according to claim 19, wherein said inverter-based apparatus further comprises comparator means configured to:
receive in input the motor speed (ω) of said electric motor;
receive in input said torque limit (Tref_lim);
receive a torque target (Tt) which is indicative of a torque requested to said electric motor;
compare said torque target (Tt) with the said torque limit (Tref_lim); and
set the torque reference (Tref(t)) with the torque limit (Tref_lim(t)), when said motor speed (ω) is positive and said torque target (Tt(t)) is lower or equal to said torque limit (Tref_lim(t)).

21. The laundry treating machine according to claim 20, wherein said comparator means are further configured to set the torque reference (Tref(t)) with the torque limit (Tref_lim(t)), when the motor speed ω is negative and the torque target (Tt(t)) is greater than, or equal to the torque limit (Tref_lim(t)).

* * * * *